United States Patent [19]

Kraus

[11] Patent Number: 4,700,482

[45] Date of Patent: Oct. 20, 1987

[54] SELF-SUPPORTING GRADUATION CARRIER

[75] Inventor: Heinz Kraus, Traunreut, Fed. Rep. of Germany

[73] Assignee: Dr. Johannes Heidenhain GmbH, Traunreut, Fed. Rep. of Germany

[21] Appl. No.: 821,408

[22] Filed: Jan. 22, 1986

[30] Foreign Application Priority Data

Jan. 31, 1985 [DE] Fed. Rep. of Germany ....... 3503144

[51] Int. Cl.⁴ .......................... G01D 5/34; G01D 5/36
[52] U.S. Cl. .............................. 33/1 PT; 250/231 SE; 250/233
[58] Field of Search ................. 33/1 PT; 250/231 SE, 250/233

[56] References Cited

U.S. PATENT DOCUMENTS

| | | | |
|---|---|---|---|
| 2,977,480 | 3/1961 | Keene | 250/233 |
| 3,231,807 | 1/1966 | Willis | 250/233 |
| 3,770,971 | 11/1973 | Somerset | 250/233 |
| 3,843,883 | 10/1974 | De Vita et al. | 250/233 |
| 3,965,349 | 6/1976 | Jespersen | 250/231 SE |
| 4,256,958 | 3/1981 | Cornwell | 250/233 |
| 4,446,367 | 5/1984 | Babsch et al. | 250/233 |

Primary Examiner—Richard R. Stearns
Attorney, Agent, or Firm—Willian Brinks Olds Hofer Gilson & Lione Ltd.

[57] ABSTRACT

A galvano-plastically produced graduation carrier comprising fine perforations located within a perforation zone wherein stability enhancement regions in the form of prominences and depressions in the embodiment are located outside the perforation zone. The stability enhancement regions enhance the ability of the graduation carrier to be self-supporting. The area of the graduation carrier within the perforation zone can therefore be made thinner than other areas of the graduation carrier. This provides a graduation carrier which not only has improved edge sharpness and fineness of the perforations but also a high bending rigidity and improved handleability.

9 Claims, 5 Drawing Figures

SELF-SUPPORTING GRADUATION CARRIER

BACKGROUND OF THE INVENTION

The present invention relates to a galvano-plastically produced graduation carrier comprising a plurality of fine perforations located within a perforation zone, wherein the cross-sectional profile of the graduation carrier comprises regions of depressions and/or prominences with respect to the perforation zone.

A graduation carrier is typically used in a measuring instrument to measure the relative movement of two objects movable with respect to one another. The measuring instrument frequently comprises a scanning unit and a graduation carrier. The scanning unit is connected to one of the objects and the graduation carrier is connected to the other one of the objects. As the objects move relative to one another, the graduation carrier moves relative to and is scanned by the scanning unit. Electrical signals produced by the scanning unit are indicative of the relative movement of the two objects.

The galvano-plastic process may be used to produce a thin metal coating on a specially formed base body. Briefly, the process typically involves applying a layer of photo-resist material to a base body and selectively exposing regions of the photo-resist layer to light in a manner similar to that used in the production of semiconductors. The photo-resist layer and base body are then processed such that only the portion of the base body corresponding to openings in the desired metal coating remain covered by the photo-resist layer. The processed photo-resist layer and base body are then subjected to an electrolytic process wherein the base body is connected as a cathode electrode and a metal plate as an anode electrode. An electrolytic solution is used which is preferably an acidic salt solution containing the deposit metal. The photo-resist layer and the electrolytic solution are such that the processed photo-resist layer is not damaged by the electrolytic solution. As an electric current is passed between the anode and cathode electrodes, the metal coating gradually forms on the base body. After the metal coating has reached its desired thickness it is rinsed and detached from the base body.

The use of galvano-plastically produced grid graduations in photo-electric angular motion transducers is well-known, Industrie-Anzeiger ii, 1966, No. 67, pp. 1497–1498. However, the cross-sectional profile of this type of graduation carrier is flat. Thin, flat graduation carriers have the disadvantage of poor mechanical stability. If the graduation carrier is made thicker to enhance its mechanical stability, the resolution of the graduation may be sacrificed.

The grid constant, edge sharpness, etc. of a galvano-plastically produced grid graduation is limited, as is well-known, by the resolution of the photo-resist used in the process. The thickness and therefore the corresponding stability of the graduation carrier is limited by the thickness of the photo-resist used in the galvano-plastic process. The thickness of the photo-resist and the resolution of the photo-resist are correlated in such a way that increasing the thickness of the photo-resist causes a decrease in the resolution of the photo-resist. However, decreasing the thickness of the photo-resist produces a decrease in the stability of the flat galvano-molded component.

The present invention overcomes the disadvantage of poor mechanical stability in relatively thin galvano-plastically produced graduation carriers and the disadvantage of poor grid constant and edge sharpness in relatively thick galvano-plastically produced graduation carriers.

SUMMARY OF THE INVENTION

The present invention is directed to a galvano-plastically produced thin, self-supporting graduation carrier with high mechanical stability, high edge sharpness and a plurality of fine, precise perforations.

According to this invention, a self-supporting graduation carrier is produced in the form of a metal foil. The graduation carrier is produced by the galvano-plastic process and comprises a plurality of fine perforations. These perforations are located within a perforation zone and define a plane. The shape of the graduation carrier is such that a cross-sectional profile presents depressions and/or prominences with respect to the plane of the perforation zone.

In a preferred embodiment of the present invention, the depressions and/or prominences are in the form of concentric corrugations. In a second preferred embodiment, the depressions and/or prominences are in the form of concentric corrugations wherein the region of the corrugation protruding with respect to the perforation zone is of a thickness greater than the thickness of the region comprising the perforation zone.

One important advantage of the preferred embodiments described below is that the graduation carrier is in the form of a thin metal foil whose physical shape is highly stable. An additional advantage of these embodiments is that the resolution of the photo-resist can be substantially utilized to produce the fine perforations. A further advantage of these embodiments is that a very thin, disk-shaped graduation carrier with low mass and a highly stable form is produced. Such graduation carriers are especially suited for use in angular motion transducers and interrupters.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1A:
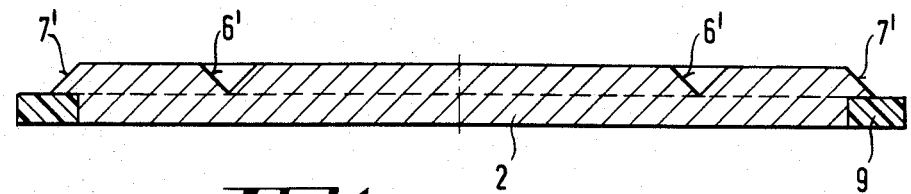
FIG. 1a is a cross-sectional representation of the base body and the surrounding ring used in the production of a first preferred embodiment of the present invention.
Figure 1B:
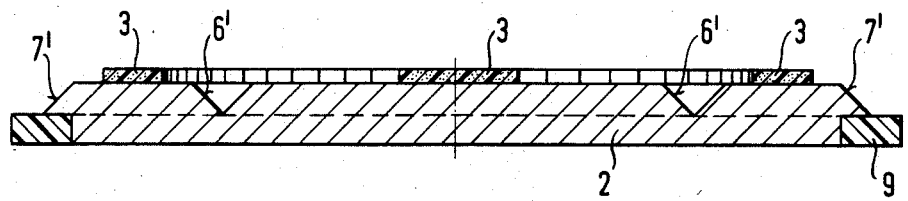
FIG. 1b is a cross-sectional representation of the components of FIG. 1a with the addition of an electrically insulating layer.
Figure 1C:
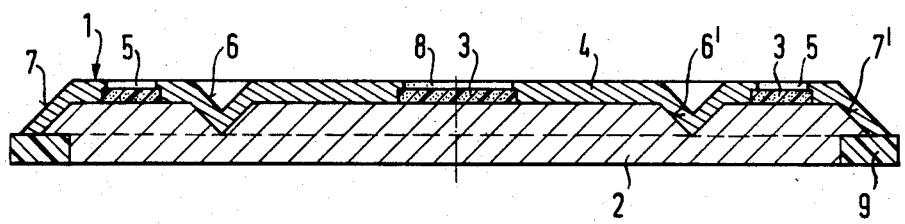
FIG. 1c is a cross-sectional representation of the components shown in FIG. 1b with the addition of a galvano-plastically produced metal layer.
Figure 1D:
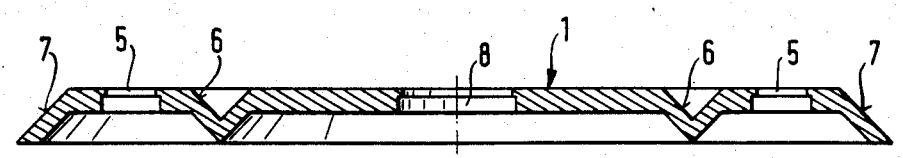
FIG. 1d is a cross-sectional representation of a first preferred embodiment of the present invention.

With reference to the drawings, FIGS. 1a–1d illustrate the production of a preferred embodiment of the present invention by the galvano-plastic process. An electrically conducting base body 2 serving as a matrix is covered in specific regions with an electrically insulating layer 3. A metal coating 4 is then deposited on the base body 2 by the galvano-plastic process. As a result of the process, the regions of the base body 2 that have remained free of the insulating layer 3 are deposited with a metal coating 4. The thickness of the metal coating 4 is preferably only slightly greater than the thickness of the insulating layer 3 in order to achieve a high edge sharpness.

In order to achieve the required mechanical stability in a thin self-supporting graduating disk 1, the base body 2 comprises a depression in the form of a circular, concentric groove 6'. To further enhance the mechanical stability of the disk 1, the border of the base body 2 comprises a bevel 7'. The bevel 7' results in a beveled collar formation 7 on the circumferential edge of the disk 1.

The galvano-plastic deposit of the metal coating 4 occurs uniformly over the entire form surface of the base body 2 that is not covered by the insulating material 3. Virtually all of the regions of the metal covering 4 are homogeneous, equal in thickness and free of tension. The perforations 5, centering bore 8 and form reinforcements 6, 7 in the form of a corrugation and bevel, respectively, can be produced in one operation. A non-conducting surrounding ring 9 serves to define the border during the formation of the graduating disk 1 and can also be used to lift off the disk 1 from the base body 2 after the disk 1 is formed.

These form reinforcements, corrugations 6 and bevel 7, can be introduced not only in the forms shown but in other forms, particularly as raised portions of the disk 1.

Figure 2:
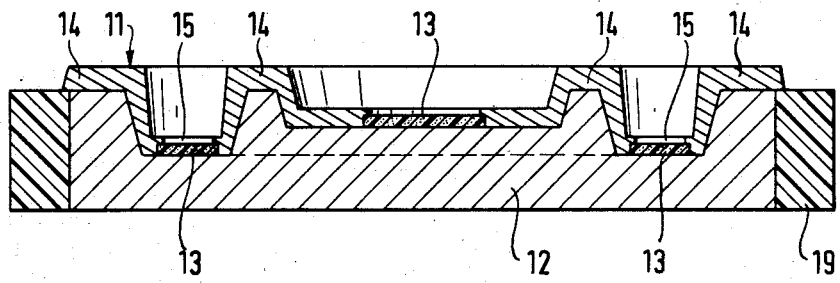
FIG. 2 is a cross-sectional representation of the base body, surrounding ring, insulating layer and metal layer used in the production of a second preferred embodiment.

A second preferred embodiment is cross-sectionally shown in FIG. 2. This embodiment utilizes the effect that at raised portions a higher electric current density during the galvano-plastic process produces a thicker and more stable metal deposit 14 on the base body 12. The zones comprising the graduation 15 must therefore lie in depressions relative to the raised portions in order to take full advantage of the resolution of the photoresist. In the example shown, the surfaces covered with insulating material 13 for the centering bore and the graduation lie in two planes. As in the preferred embodiment described above, a non-conducting ring 19 can serve to lift the graduating disk 11 from the base body 12. The thickness of the metal deposit 14, the contour formation of the graduation 15 zone and the stability of the graduating disk 11 are thereby determined by the shape of the base body 12.

The perforations produced in the process described above define the slit-shaped recesses of the graduation carrier which form the grid graduation.

By way of illustration, and with no limitations intended, the following information is given to define the preferred embodiments in greater detail. In the first preferred embodiment the bevel 7 is angled 25° with respect to the central axis defined by the center bore 8. Corrugation groove 6 comprises two sides with one side angled at +25° and the other side angled at −25° with respect to the central axis. The center of the groove 6 is located 6 mm from the circumference of the disk 1. The protrusion of groove 6 from the underside of the disk 1 measures 1 mm from the top side of the disk 1. In the first and second preferred embodiments, the perforations 5, 15 measure 3 mm by 50 μm, the diameter of disk 1, 11 measures 40 mm, the metal coating 4, 14 comprises nickel with layer thickness of 30 μm and the base body 2, 12 comprises chrome steel.

Of course, it should be understood that a wide range of changes and modifications can be made to the preferred embodiments described above. For example, the invention is not limited to the production of graduating disks 1, 11. It is also possible to construct other measurement embodiments, in particular short linear scales and scanning plates for photo-electric linear measuring systems. It is therefore intended that the foregoing detailed description be regarded as illustrative rather than limiting, and that it be understood that it is the following claims including all equivalents, which are intended to define the scope of this invention.

I claim:

1. In a self-supporting graduation carrier of the type used in position and velocity measuring systems wherein the carrier comprises a galvano-plastically produced metal foil disk, the metal foil disc defining a center and a circumferential edge, the foil disc comprising a plurality of perforations located within an annular region about the center of the foil, the annular region of perforations defining a plane, the improvement comprising:

at least one first annular stability enhancement region located between the center of the foil and the annular perforation region; and at least one second annular stability enhancement region located between the annular perforation region and the circumferential edge;

the first and second enhancement regions adapted such that a cross-sectional profile of the metal foil comprises at least one formation wherein the foil extends outwardly with respect to the perforation plane.

2. The invention of claim 1 wherein the foil disc measures approximately 30 micrometers in thickness.

3. The invention of claim 1 wherein each perforation measures approximately 3 millimeters by 50 micrometers.

4. The invention of claim 1 wherein the second enhancement region comprises a beveled collar formation.

5. The self-supporting graduation carrier of claim 1 wherein the second annular stability enhancement region defines a collar formation.

6. The self-supporting graduation carrier of claim 1 wherein the metal foil disk is shaped for adaptation in photoelectric angular motion transducers.

7. The self-supporting graduation carrier of claim 1 wherein the second annular stability enhancement region defines at least one collar formation comprising a beveled circumferential edge of the metal foil disk.

8. The self-supporting graduation carrier of claim 1 wherein the metal foil further comprises a beveled collar formation.

9. In a graduation carrier of the type used in measuring systems wherein the carrier is produced by a metal deposition process in the form of a metal foil disc defining a center, a circumferential edge and a plane, the foil disc comprising a plurality of perforations defining an annular ring about the center of the foil, the improvement comprising:

a region comprising at least one annular formation in the foil, the formation extending slightly transverse to the plane of the foil and located between the center of the foil and the ring of perforations; and a circumferential formation of the foil extending slightly transverse to the plane of the foil;

the annular formation and the circumferential formation operating to enable the foil to be self-supporting in the region between the annular formation and the circumferential formation.

* * * * *